May 15, 1945. H. C. CAMPBELL ET AL 2,376,120
FOWL-PLUCKING APPARATUS OR THE LIKE
Filed July 1, 1943 2 Sheets-Sheet 1

INVENTORS
Harold C. Campbell.
Heyward D. Thomas.
BY Corbett, Mahoney + Miller
ATTORNEYS May 15, 1945.  H. C. CAMPBELL ET AL  2,376,120
FOWL-PLUCKING APPARATUS OR THE LIKE
Filed July 1, 1943  2 Sheets—Sheet 2

INVENTORS
Harold C. Campbell.
Heyward D. Thomas.
BY Corbett, Mahoney & Miller
ATTORNEYS Patented May 15, 1945

2,376,120

UNITED STATES PATENT OFFICE 2,376,120

FOWL-PLUCKING APPARATUS OR THE LIKE

Harold C. Campbell and Heyward D. Thomas, Delaware, Ohio

Application July 1, 1943, Serial No. 493,000

4 Claims. (Cl. 17—11.1)

Our present invention relates to improvements in fowl-plucking apparatus or the like. It has to do, particularly, although not exclusively with an apparatus for plucking or removing the feathers or down from fowl such, for example, as chickens, turkeys, geese or ducks.

In all previously known apparatus for removing feathers from fowl it has been necessary to hold the fowl in position during the plucking operation. Thus, such apparatus has required the constant attention of an operator to place the fowl in position to have its feathers plucked and also to hold the fowl down in position against the plucking device with one hand and to hold the legs or feet of the fowl with the other hand during the plucking operation. Since the fowl was previously scalded and then transferred directly to the plucking apparatus and held therein, the operator was often subjected to burns and infection as the result thereof. Moreover, with previous apparatus of this general nature the plucking means or instrumentalities have not proved satisfactory to do a thorough job of clean-picking or plucking of a fowl due to the fact that in some instances the feather-removing members were of too flexible character and did not engage the feathers with sufficient force to remove them efficiently. In other instances previously known feather-removing apparatus had fingers which were made so stiff and inflexible in an effort to do an efficient job, that too great a pressure was exerted upon the fowl and while removing the feathers, also, in many cases, tore the skin during the plucking operation. The results obtained by the two types of apparatus referred to were not satisfactory. With the first type of apparatus described above it was necessary to finish-pick the fowl by hand after it was removed from the apparatus, whereas with the latter type of apparatus which tore or bruised the skin the plucked fowl did not present a pleasing dressed appearance and its sale value was accordingly reduced.

One of the objects of our invention is to provide an improved fowl-plucking apparatus, which is of relatively simple construction and thus relatively inexpensive and easy to manufacture and one which performs the operation of plucking or removing the feathers or the like from fowl in a highly efficient and satisfactory manner.

Another object of the invention is to provide an improved fowl-plucking apparatus which is mechanically operated and which eliminates the necessity of manually holding the fowl down against the plucking means or members with the operator's hand in contact with the scalded body and feathers of said fowl.

Another object of the present invention is to provide an improved fowl-plucking apparatus or device of the foregoing character capable of plucking or picking fowl of different types and of different sizes, without the necessity of manually holding and pressing the body of the fowl down in place against the plucking or feather-removing members during the operation of removing the feathers.

A further object of the present invention is to provide an improved apparatus of the foregoing character having means for holding the fowl down during the plucking operation while at the same time applying a predetermined amount of pressure to the fowl to hold it in proper position against the feather-removing members of the apparatus to effect the efficient removal or plucking of the feathers therefrom.

Another object of the invention is to provide an improved apparatus having adjustable means for holding the fowl down in plucking position and also having improved means for varying the amount of force or pressure applied to the fowl by the holding down means to maintain it in proper relationship with respect to the plucking means during the plucking operation; said means being capable of quick and easy adjustment to vary the pressure weight for different types of fowl, as well as to permit it to be varied in accordance with different temperatures of scalding water to which the fowl have been subjected prior to their being plucked.

A further object of the present invention is to provide improved plucking means or members which, while having the necessary stiffness and being capable of engaging the fowl with sufficient force or pressure to efficiently remove the feathers therefrom, have the characteristic of sufficient flexibility so as to prevent tearing or damaging of the skin of the fowl during the operation of removing the feathers.

Another object of the present invention is to provide fowl-engaging and feather-plucking or removing means or members which are preferably round in cross section and which are formed from relatively stiff yet sufficiently flexible or bendable material, such as rubber or synthetic rubber.

Another object of the invention is to provide feather-removing means such as preferably round finger-like members attached to and carried by a rotatable member or drum of the apparatus, in which said members are relatively stiff but sufficiently flexible to prevent marring of the skin of the fowl, and in which the flexibility of said members increases progressively from the portions thereof adjacent the revolving supporting drum or cylinder to the outer or free ends of said members.

A further object of the present invention is to provide fowl-plucking finger-like members or means in which said members may be readily applied to or detached from the supporting member or drum of the apparatus.

Another object of the invention is to provide improved relatively stiff flexible members for removing or plucking feathers from a fowl in which each of said members has a solid body portion of tapered or frusto-conical form and a plurality of spaced outwardly projecting annular portions and intervening grooves presenting longitudinally relatively sharp corners for engagement with the feathers of the fowl to be plucked; another object being to provide such members with self-contained means for detachably connecting them to the rotatable supporting drum or member of the apparatus.

Generally speaking the apparatus of the present invention comprises a body portion having surrounding walls and an opening in the bottom thereof, an upwardly and forwardly or inwardly directed hood for directing the plucked feathers toward the opening in the body portion, a rotatable drum or member journaled in opposed walls of the body portion and located adjacent the hood and carrying feather-removing or plucking devices or members on the perimeter thereof, together with an adjustable and if desired, weighted, fowl-holding member or shield which is so supported as to overlie the rotatable drum in predetermined spaced relation thereto so as to hold the fowl in position during the plucking operation and thus eliminate the necessity of manual holding or supporting of the fowl during said operation.

The above and other objects and advantages of the present invention will appear from the following description and appended claims when considered in connection with the accompanying drawings forming a part of this specification wherein like reference characters, designate corresponding parts in the several views.

Figure 1:
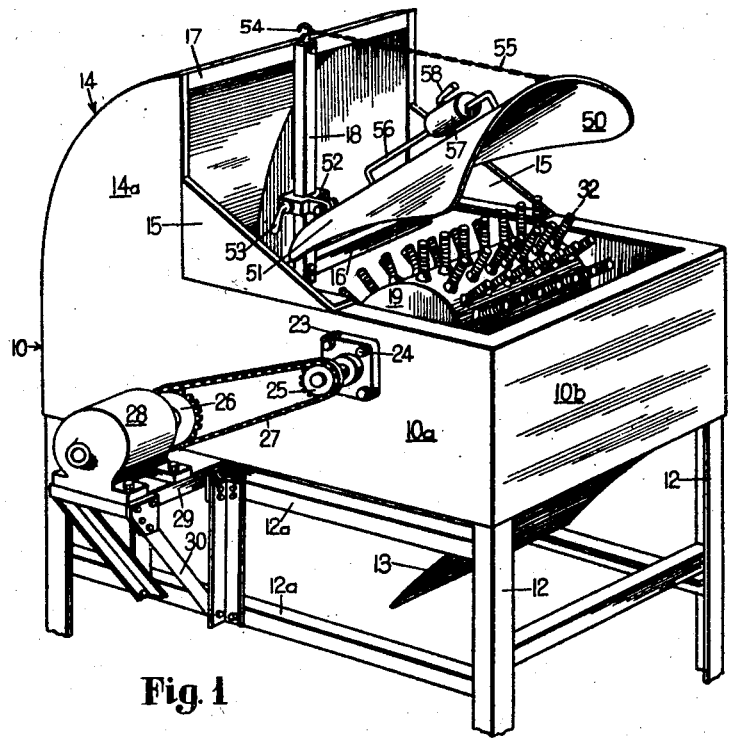
Figure 1 is a perspective view of one form of improved fowl-plucking apparatus embodying the present invention.
Figure 2:
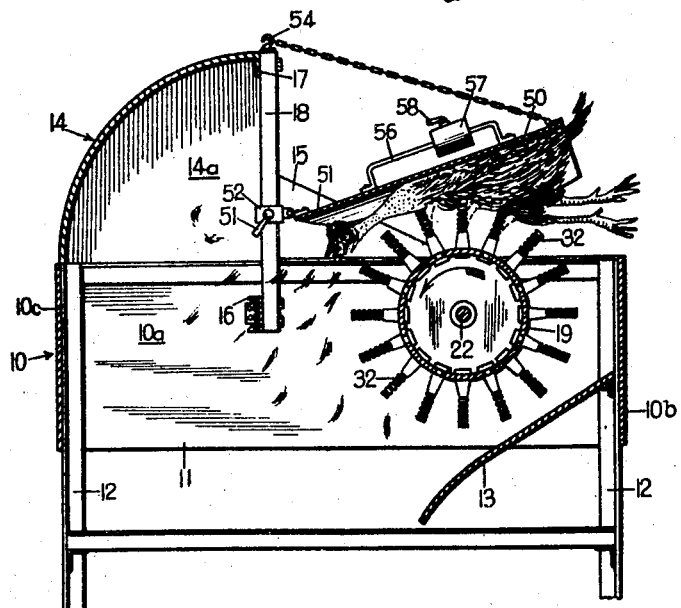
Figure 2 is a longitudinal vertical section through the machine or apparatus of Figure 1.
Figure 3:
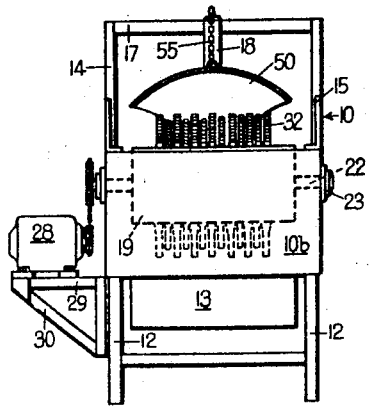
Figure 3 is a front elevational view of the apparatus embodying the invention, shown on a smaller scale than in Figures 1 and 2.
Figure 4:
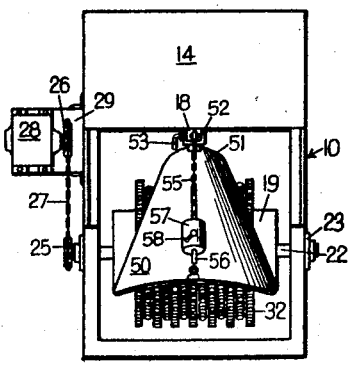
Figure 4 is a top plan view of the apparatus of Figure 3.
Figure 5:
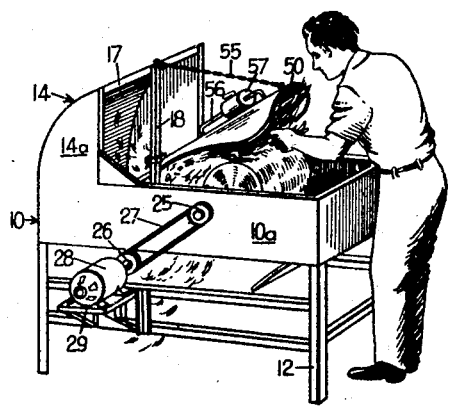
Figure 5 is a perspective view of the machine of the preceding figures illustrating an attendant applying a fowl to the apparatus to be held in position during the operation of plucking the feathers therefrom.

Referring now particularly to Figures 1 to 5, inclusive, of the drawings, wherein there is shown one form of apparatus embodying our invention, 10 represents as a whole the body portion of the apparatus which is provided with surrounding walls and which has an open bottom 11. The body portion is, as shown, supported by a plurality of upright members or legs 12 so as to be spaced somewhat above the surface of a floor or the like. A baffle wall or plate 13 is connected to the front end wall 10b of the body portion and projects inwardly and downwardly as seen in Figure 2 beneath and in spaced relation to the periphery of the revolving drum.

The rear end portion or wall 10c of the body 10 is provided with an upwardly and forwardly extending hood member 14 provided at its side forward edges with extensions or gusset plates 15 which are attached to the upper edges of the side walls 10a of the body. A cross member or channel 16 extends transversely of the body portion at the juncture of the forward edges of the end walls 14a of the hood 14 and a similar member 17 is provided at the upper edges of these side walls and interconnects the same at the forward top edge of the hood. A vertically disposed guide bar or member 18 is secured at its top and bottom portions to the cross members 17 and 16, respectively, and is located at a point which is substantially midway between the end or side walls 14a of the hood.

Located within the body portion 10 in advance of the hood 14 is a rotary drum or cylindrical member 19 having formed in its perimeter a plurality of spaced holes or openings 20 providing sockets for the fowl-engaging and feather-plucking members to be presently described. By reference to Figure 7 it will be seen that these openings or sockets 20 are arranged in rows longitudinally of the drum and that the sockets of each successive row are staggered with relation to the sockets of the next preceding row. Thus, when the feather-plucking members or fingers are applied to the drum they will likewise extend in rows which are staggered longitudinally of the drum.

Figure 7:
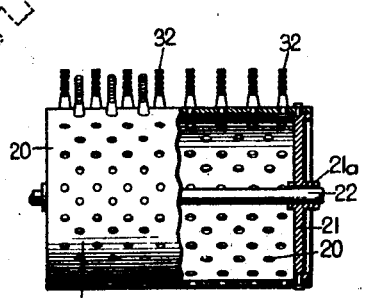
Figure 7 is an elevational view, partly broken away and partly in section, of the revolving drum or member of the apparatus showing the arrangement of the feather-plucking means or members with relation thereto.

As shown, see particularly Figure 7, the drum 19 is provided with end members or heads 21 which are removable and which have hub portions 21a for mounting the drum upon a transversely extending rotatable shaft 22, the drum heads being preferably keyed to said shaft so as to revolve with it.

The shaft 22 extends through the side walls 10a and is journaled in suitable bearings carried by the side walls, one such being best shown at 23 in Figure 1. These bearings are preferably removably held in place by bolts or the like 24. The shaft 22 is extended through and beyond the bearing 23 on the left side wall 10a and carries adjacent its outer projecting end a sprocket 25 which is driven by a sprocket 26 through the medium of a connecting sprocket chain 27. The sprocket 26, which is the driving sprocket, is mounted upon the shaft of an electric motor 28, said motor being supported in any suitable manner, as by means of a platform 29 having supporting members or braces 30 which are attached to the longitudinal frame members 12a of the apparatus base. It will be understood that when power is applied to the motor 28, the shaft 22 and likewise the drum or member 19 are driven in a counterclockwise direction or toward the hood 14, as indicated by the arrow in Figure 2

Figure 6:
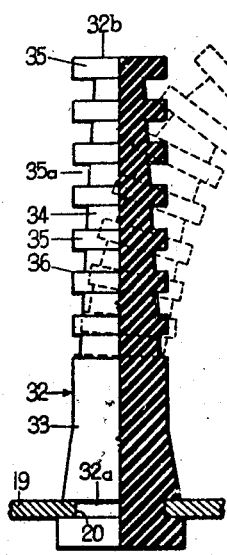
Figure 6 is a sectioned elevational view of one of the improved feather-plucking or removing members or fingers embodying the present invention.

Referring now particularly to Figures 6 and 7 of the drawings, there is shown one form of fowl-engaging and feather-plucking means or finger-like members embodying the invention. One such member is shown as a whole at 32 and comprises a base portion 33 and an outwardly tapered or substantially frusto-conical body portion 34. The body portion 34 is provided with a plurality of longitudnally spaced integral annular rib members 35 whose outer edges or peripheries are round and flat or straight and which provide therebtween spaced grooves or annular slots or openings 35a of progressively increasing depth from the base portion 33 to the outer or free end 32b, of the finger-like member. It is to be noted, see particularly Figure 6, that the projections or ring-like members 35 and the grooves or annular spaces 35a between said members are so formed as to provide a series of longitudinally spaced relatively sharp or square edges or corners 36 extending in spaced relation from the base portion 33 to the outer or free end 32b of the member 32. The base portion 33 is provided with an annular groove or slot 32a which embraces the drum around the socket 20 and serves to hold the member in position within one of the openings or sockets 20 formed in the drum 19. It will be understood that the construction is such that the member 32 will be held firmly in place yet it can be readily removed if desired.

The members 32 are preferably formed from rubber, such as synthetic rubber and may be formed by molding, or in any other suitable manner. Other suitable materials which have the characteristics of relative stiffness and flexibility may be employed since there are many other materials which will serve the purpose desired.

By virtue of the shape or formation of the member or finger 32 said member has the characteristic of the necessary stiffness to perform the desired function for which it is employed and yet also has sufficient flexibility to prevent damaging of the fowl during the operation of plucking or removing feathers therefrom. Moreover, it is to be noted that by virtue of the fact that the body portion 34 tapers outwardly from the base portion 33 and is of substantially frusto-conical form and also by virtue of the fact that the spaces or grooves 35a between the longitudinally spaced annular ribs 35 are of progressively greater depth from the body portion 33 to the outer or free end 32b of the member 32, said member has a relatively stiff or inflexible base and a body portion of progressively increasing flexibility from the base portion to the free end of the member. Since the body portion is tapered, the greater the pressure the more effective the finger becomes in pulling or removing feathers due to the fact that the finger is thicker and stiffer at its base portion 33 than at its free end 32b.

In Figure 6 we have shown in broken lines the position of the member 32 when flexed by actual contact with the fowl being plucked. It will be appreciated that this inherent feature of flexibility provides a gradually curved or flexed member which presents a series of relatively sharp square edges or corners 36 for engagement with the feathers of the fowl to quickly and efficiently pluck or remove them.

Figure 8:
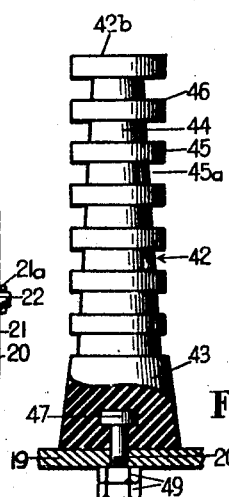
Figure 8 is an elevational view, partly in section, illustrating a somewhat modified form of feather-plucking member or finger embodying the present invention.

In Figure 8 of the drawings we have shown a somewhat modified form of feather-plucking member of finger. In this form of invention the finger is also round and is shown as a whole at 42. As shown, it has a base portion 43 and an outwardly tapered or substantially frusto-conical body portion 44. The body portion is, as in the preceding form of the invention, provided with a plurality of longitudinally spaced annular or round ribs or peripheral projections 45 between which are located annular grooves or spaces 45a, the ribs and grooves being so formed and shaped as to provide a plurality of spaced relatively sharp or square corners or edges 46 extending from the base 43 to outer end 42b. In the present form, the base portion 43 is somewhat shorter than the base portion of the preceding form and is provided with an imbedded and headed stud or bolt member 47 having an outwardly projecting threaded stem 48. The stud or bolt member is preferably molded in place in the member 42 for the purpose of providing said member with self-contained means for removably applying or attaching it to the rotatable drum 19. The member 42 is applied to the drum by passing the threaded shank 48 through one of the openings or sockets 20 provided in the drum and may be secured in place by means of a pair of nuts 49 which are threaded onto the shank and tightened down to hold the parts in position as shown in Figure 8. Aside from the attaching means and the size of the base portion, the member 42 is, in all respects similar to the member 32 of the preceding form, and functions in the same manner as said member 32.

Referring now again to Figures 1 to 5, inclusive, of the drawings, particular attention is called to the fowl-holding member or shield which is shown as a whole at 50 in these figures. As shown, the shield 50 is preferably curved transversely into a substantially arch-shape and is movably mounted at its rear or inner end at 51 to a slidable or adjustable bracket member 52 mounted upon the upright guide member 18. It is to be noted that the bracket 52 may be held in any desired position of vertical adjustment by means of a locking screw or member having a handle portion 53. In other words, the holding member, shield or the like 50 may be quickly and easily vertically adjusted with relation to the drum 19 and the fingers 32 or 42 carried thereby by simply adjusting the bracket 52 up and down on the support 18 to vary, at will, the holding pressure applied to the body of the fowl.

It will be noted that the member 50, as shown, is held in an upwardly and forwardly inclined position. It will be understood that the angle of inclination of the member may be varied so as to vary the direction of the application of pressure to the particular fowl. For supporting the shield in inclined position and for permitting its angle to be shifted or changed, I have provided an adjustable chain 55 secured at its forward end to the front edge of the shield 50 and releasably attached at its rear end to a hook member 54 carried by the upright support or guide 18. Thus, by releasing the chain from engagement with the hook and lengthening or shortening the chain, the angular position of the fowl-holding member or shield 50 may be varied.

It is advantageous to provide a shield or member 50 which is both vertically and angularly adjustable so that it can be accommodated to the particular type or size of fowl which is to be plucked.

Moreover, it is desirable, in order to effect the proper holding down in position of the fowl between the shield 50 and the flexible fingers 32 or 42 to apply a predetermined amount of force or pressure to the fowl when in position. For this purpose, I have provided the upper surface of the shield 50 with a longitudinally extending rail or rod member 56 having downturned ends which are secured in any suitable manner to the shield. A slidable weighted member 57 is mounted upon the rod and may be held in any position along the rod by means of a tightening device or clamp having an operating handle 58. By adjusting the weight 57 along the rod the weight or force applied by the shield to the fowl may be quickly and easily varied in accordance with the type or size of fowl being plucked by the apparatus.

From the foregoing it will be seen that we have provided an improved fowl-plucking apparatus and improved fowl and feather plucking members, in which the apparatus is provided with means for holding the fowl down in position to be plucked and in which improved means or members are provided for efficiently removing or plucking the feathers without damage to the fowl. By virtue of our invention, manual handling of the fowl is necessary only in placing the fowl in position to be plucked, in turning the fowl over during the plucking operation when and if desired, and in removing the plucked fowl from the apparatus. In so holding, the operator grasps the legs or feet of the fowl in one hand, leaving his other hand free, since he does not have to hold the body of the fowl down against the feather removing or plucking members as in previously known apparatus of this general nature. It is properly held in position to be plucked by the adjustable pressure applying and holding down means of the apparatus.

The shield or holding down means of the apparatus is so constructed and arranged as to apply even pressure upon the fowl or bird, and because of the fact that the fingers are of round cross section as distinguished from a rectangular or square cross section, thus eliminating longitudinal square edges at the corners, there can be no "barking" or "scuffing" of said fowl during the feather-removing operation. Our improved holding down means eliminates the necessity for manually holding the fowl down in position and thus it is unnecessary for the operator to hold the previously scalded fowl down with his hand which often resulted in severe burns and infection due to the fact that fowl are usually scalded in water which varies in temperature from 180° to 212° Fahrenheit just prior to being placed in the apparatus.

Having thus described our invention, what we claim is:

1. A feather-plucking apparatus having in combination, a substantially rectangular body portion having a discharge opening and a hood portion located at one end thereof, said body portion having means for supporting it above a floor surface, a power-operated rotatable drum located within said body portion in advance of said hood, a plurality of relatively stiff flexible fingers projecting outwardly from the perimeter of said drum in longitudinally extending rows and in staggered relation, and a shield member mounted to overlie said drum in spaced relation thereto whereby to apply pressure to a fowl positioned between said drum and shield and to direct feathers removed therefrom through said discharge opening.

2. A feather-plucking apparatus having in combination, a body portion having surrounding walls and an opening in the bottom thereof, a hood having upwardly and forwardly extending portions located at one end of the body portion, rotatable means located within the body portion adjacent said hood, said means including a plurality of projecting members for engagement with a fowl for removing feathers therefrom, and means for holding a fowl in contact with said rotatable means, said holding means being adjustably connected to and supported by said body portion.

3. A feather-plucking apparatus having in combination, a body portion having surrounding walls and an opening in the bottom thereof, a hood having upwardly and forwardly extending portions located at one end of the body portion, rotatable means located within the body portion adjacent said hood, said means including a plurality of projecting members for engagement with a fowl for removing feathers therefrom, and means for holding a fowl in contact with said rotatable means, said holding means being adjustable in a substantially vertical plane relative to said body portion and hood whereby to vary the space between said means and said projecting fingers.

4. A feather-plucking apparatus having in combination, a body portion having surrounding walls and an opening in the bottom thereof, a hood having upwardly and forwardly extending portions located at one end of the body portion, rotatable means located within the body portion adjacent said hood, said means including a plurality of projecting members for engagement with a fowl for removing feathers therefrom, and means for holding a fowl in contact with said rotatable means, said holding means being movably connected to said body portion and weighted whereby to apply a predetermined amount of pressure in the right direction to a fowl positioned between said rotatable means and said holding means.

HAROLD C. CAMPBELL.
HEYWARD D. THOMAS.